Figures 1, 2:
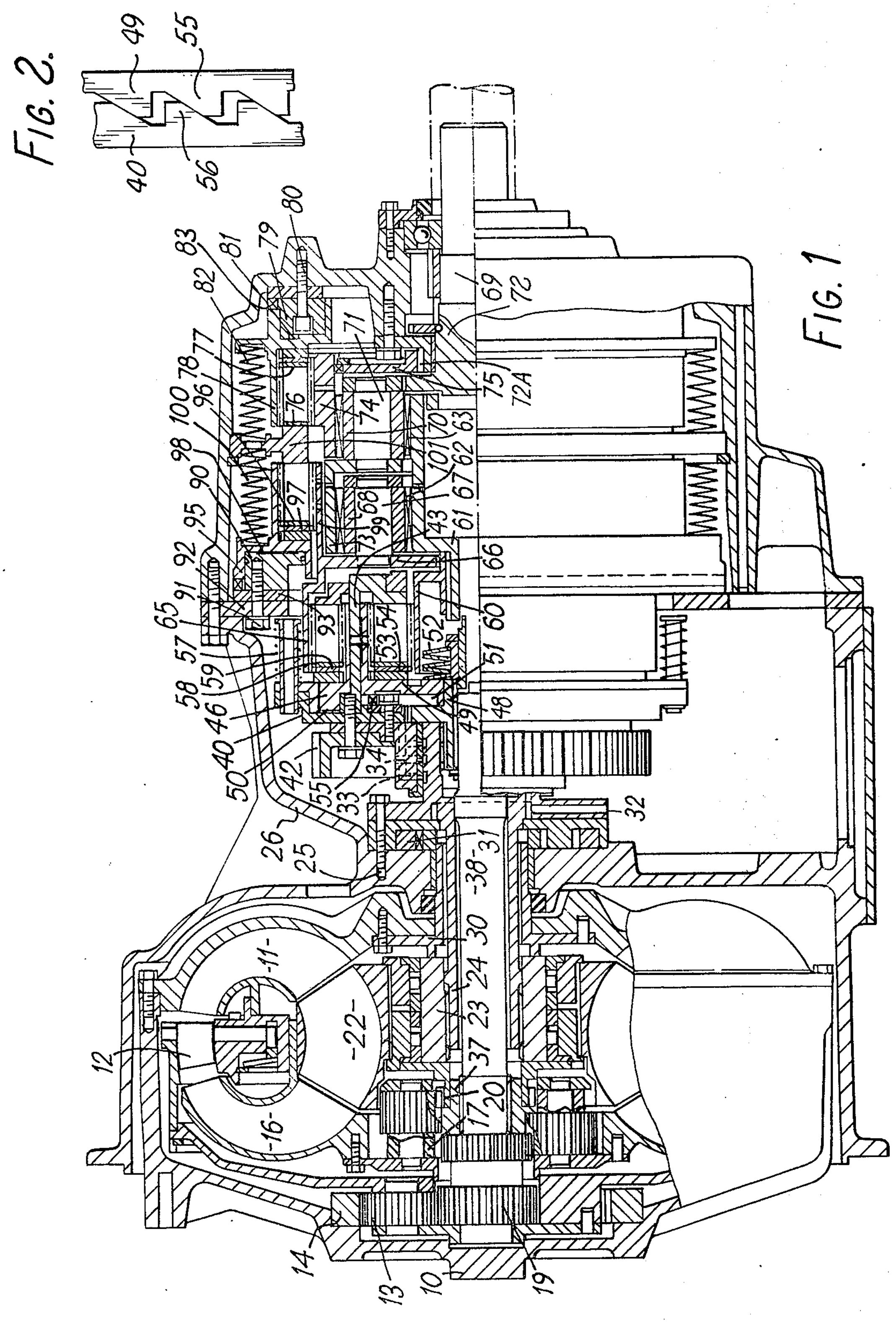

United States Patent [19]
Hobbs

[11] 3,971,260
[45] July 27, 1976

[54] POWER TRANSMISSION APPARATUS

[75] Inventor: Howard Frederick Hobbs, Napton-on-the-Hill, England

[73] Assignee: Variable Kinetic Drives, Ltd., England

[22] Filed: Aug. 28, 1974

[21] Appl. No.: 501,414

[30] Foreign Application Priority Data

Sept. 4, 1973 United Kingdom............... 41542/73

[52] U.S. Cl. ............................. 74/337.5; 74/752 B; 192/93 A; 192/53 B; 192/54

[51] Int. Cl.² .................... F16D 23/00; F16D 43/20; F16H 5/06; F16H 3/74

[58] Field of Search.................... 192/3.52, 3.57, 52, 192/53 B, 54, 48.92, 18 A, 93 R, 93 A; 74/337.5, 751, 752 B

[56] References Cited

UNITED STATES PATENTS

| | | | |
|---|---|---|---|
| 2,848,086 | 8/1958 | Warsaw | 192/93 A |
| 2,861,665 | 11/1958 | Passler | 192/54 X |
| 3,161,270 | 12/1964 | Aschauer | 192/53 B |
| 3,252,553 | 5/1966 | Peterson | 192/54 X |
| 3,321,054 | 5/1967 | Johnson et al. | 192/18 A X |
| 3,354,994 | 11/1967 | Sieving et al. | 192/18 A X |
| 3,508,450 | 4/1970 | Richards | 192/18 A X |
| 3,580,371 | 5/1971 | Kron et al. | 192/18 A |
| 3,747,727 | 7/1973 | Dach et al. | 192/18 A |

*Primary Examiner*—Samuel Scott
*Assistant Examiner*—Lance W. Chandler
*Attorney, Agent, or Firm*—Dowell & Dowell

[57] ABSTRACT

This invention concerns a power transmission gearing having friction devices i.e. clutches and/or brakes for holding and freeing parts of the gearing for changing the driving ratio, said devices having axially engageable friction surfaces which are urged in opposite directions by resilient means so that some engaging load can be applied or released and co-operating surfaces having a cam action are connected with the respective friction surfaces and so arranged that the torque load transmitted by the friction surfaces acts to produce an additional load in the axial direction which presses the friction surfaces together.

7 Claims, 2 Drawing Figures

POWER TRANSMISSION APPARATUS

This invention relates to gearing for power transmission apparatus provided with friction devices, i.e. at least one clutch and at least one brake, for holding and freeing parts of the apparatus for changing the driving ratio. An example of such apparatus is described in patent specification No. 1,199,521 with reference to FIG. 13 thereof and No. 1,347,045.

A difficulty associated with gearing of this kind results from the very high actuating loads often required for engaging the friction elements of the devices.

Certain types of peripheral loading devices such as band brakes may have a self loading effect but axially engaging devices (i.e. cone and plate brakes and clutches) do not have self loading characteristics but are often more suitable for other reasons.

A primary object of the present invention is to provide a required degree of self loading in either one or both directions of operation of axially engaging friction devices.

A further object of the invention is to achieve the primary object with a simple and effective construction.

The invention will be further described by way of example with reference to the accompanying diagrammatic drawings, wherein:

FIG. 1 is a sectional view of a frictional device made in accordance with the invention; and FIG. 2 shows cam teeth.

FIG. 1 shows a gearing having a torque converter which is similar to that described in the specification of British Pat. No. 1,347,045. This includes an input member 10 connected to an impeller 11, a circulatory turbine 12 connected by pinions 13 and ring gear 14 to the input member 10. An output turbine 16 is geared by sets of pinions 17 to a double sunwheel 19 and to a reaction sunwheel 20. The double sunwheel 19 is also meshed with the pinions 13. The reaction sunwheel 20 is connected to a reaction member 22 which surrounds a reaction hub 23 splined on to a reaction sleeve 24. Between the member 22 and 23 are friction elements providing a unidirectional clutch. The sleeve 24 is fixed by bolts 25 to the fixed casing 26 of the apparatus. The impeller is connected to a pump driving member 30 which drives a pump 31. The pump 31 feeds fluid pressure into a bore 32 which is connected to various channels such as 33, 34 leading to clutches and brakes to be described. The spindles of the pinions 17 are mounted in a cage 37 which is splined to an output shaft 38 which forms an imput shaft to a toothed gearing forming the subject of the present invention and now to be described.

Splined on to the shaft 38 is an input member 40 which, carries a power take-off gear 42 on one side and a cylinder member 43 on the other side.

The member 40 has an outer flange which with the member 43 forms a cylinder containing an annular piston 46. The member 40 also has an inner flange 48 which with the member 43 forms a cylinder containing a piston 49 that forms a drum. Fluid can be introduced at 50 between the member 40 and the piston 46 and fluid can be introduced at 51 between the member 40 and the piston or drum 49.

The drum 49 carries the outer friction plates 53 of a first clutch the friction surfaces of which are engageable with the friction surfaces of inner friction plates 54 when fluid pressure is introduced into the space 51. Diaphragm type springs 52 serve to disengage the plates of the first clutch.

The drum has cam projections in the form of cam teeth 55 engageable with similar teeth 56 (FIG. 2) on the member 40, the teeth being shaped to provide an axial separating force between the member 40 and drum 49 which force increases with increasing torque load occurring only in one direction of rotation which occurs when the first clutch is engaged to effect positive drive and down change of transmission ratio.

The piston 46 carries one set of friction plates 58 of a second clutch engageable with plates 59 on introduction of fluid pressure into the space 50. The second clutch is not provided with cam projections such as 55. Springs 57 serve to disengage the plates of the second clutch.

The plates 54 of the first clutch are carried by an annular member 60 which is splined on to a sungear 61 which has two sets of teeth 62, 63.

The plates 59 of the second clutch are carried by an annular member 65 that is carried by a plate 66 that forms a cage in which are mounted the spindles 67 of a set of pinions 68 which mesh with the teeth 62. A second set of pinions 70 have their spindles 71 mounted in a second cage 72. The second cage is carried on an output shaft 69. The pinions 70 mesh with the teeth 63. The cage 71 carries a ring gear 73 meshing with the pinions 68. A second ring gear 74 is carried by a support plate 75 and meshes with the pinions 70. The plate 75 is mounted on a bearing 72A. The ring gear 74 carries friction plates 76, the friction surfaces of which are engageable with a set of friction plates 77 carried by a drum 78 which is shaped as an annular cylinder housing a piston 79 which is fixed by bolts 80 to the fixed casing of the apparatus. Fluid pressure introduced into a space 81 urges the drum axially to engage the brake and thereby hold the ring gear 74 stationary. Springs 82 serve to disengage the brake plates. The drum 78 has cam projections 83 engaging cam projections on the piston 79 these projections being similar to 55, 56 and provide axial engagement loading in one direction only of torque which occurs during down change of transmission ratio, i.e. reaction or negative torque.

To provide reverse drive a piston member 90 is fixed by bolts 91 to plates 92, 93 the former of which is fixed to the casing of the apparatus. The piston 90 is housed in a cylinder formed by drum 95. The drum 95 carries friction plates 96 of a reversing brake. The plates 96 are engageable with plates 97 carried by an annular member 99 which is an extension of the member 65 and cage 66. Engagement is effected by introducing fluid pressure into a space 98 between the piston 90 and the drum 95. The plates are normally held disengaged by springs 100.

A fixed plate 101 serves as an abutment plate for the friction plates and spring of both brakes.

1st gear

This is produced by engaging the first clutch 53, 54 and brake 76, 77. The second clutch is disengaged. The brake 76, 77 is engaged. Drive occurs through 38, 40, 53, 54, 60, 61, 63, 72, 69. Torque occurs on the first clutch, which is self loaded by cam projections 55 acting in the driving direction.

2nd gear

The second clutch 58, 59 is engaged. The brake 76, 77 remains engaged and the first clutch 53, 54 is disengaged. The drive occurs through 38, 40; 65, 66, 68; 73, 72, 69.

3rd gear (top or 1:1 gear)

The first clutch 53, 54 is re-engaged. The second clutch remains engaged. The brake is released. The gears cease to rotate relatively to each other and solid drive ensues. In making this change the torque is in the non-self loading direction — it is running faster than the input so that this up change is not self loading. Torque is low.

In changing back 3rd to 2nd gear

The first clutch is released. The second clutch remains engaged. The forward drive brake engages and is self timing.

In changing back 2nd to 1st gear

The second clutch is released and the first clutch is engaged in the self loading direction and provides self timing.

Reverse gear

The first clutch 53, 54 is engaged. The reversing brake 96, 97 is engaged. The brake 76, 77 is disengaged. The pinions 68 now drive in reverse and drive the cage 72 and output member 69.

It will be seen that in the first clutch there is a drum 49, a first apparatus part 40, the parts 49, 40 being formed as a cooperating piston and cylinder device, said drum carrying one set of friction surfaces 53. A second apparatus part 60 carries the other set of friction surfaces. The friction surfaces, drum and second apparatus are rotatably displaceable about a common axis. A first actuating means (pump 31) serves to urge the piston and cylinder in one direction to engage the friction surfaces. A second actuating means (springs 52) serves to urge the piston and cylinder in the opposite direction to disengage the friction surfaces. Cam projections 55, 56 on the drum and first apparatus part 40 provide the self loading effect on the friction surfaces. This clutch is self loading in first gear but when second gear is engaged the first clutch runs faster than the input and automatically unloads for disengagement.

The brake 76, 77 has a similar drum and first apparatus part (in this case the fixed casing) and second apparatus part (ring gear 74) and similar cam projections 83. The drum in this case does not rotate but is rotatably displaceable to the small extent permitted by the cam projections 83. The projections 83 provide self loading only in the direction of reaction. This brake is always self timing when about to provide driving reaction. It loads when required and unloads when not required.

The reverse brake is similar with self loading to carry the high reverse reaction.

In addition to enabling high torques to be more easily carried by the friction clutches and brakes, self loading action is very desirable when changing down i.e. to a ratio providing an increase in input speeds. Input speed can be allowed to increase during the change and the clutch or brake will automatically begin to engage when speeds synchronise and torque begins to act in the appropriate direction thereby eliminating shock but self loading action is undesirable for up changes i.e. to a ratio providing a reduced input speed as torque acts as soon as the change is commenced and self loading action can produce high engaging loads when speeds are not synchronised thereby producing shock.

For a given angle on the cam projections and coefficient of friction a number of plates can be selected to give an appropriate maximum self engaging action.

I claim:

1. A power transmission apparatus comprising a fixed part (e.g. 79), a rotary input member (e.g. 40) a clutch having engageable input and output clutch members (e.g. 49, 60), means for engaging and releasing the clutch members, said input clutch member being driven by said rotary input member (40), a planetary gearing having an input gear member (61) connected with said clutch output member, a brake acting on part (74) of said planetary gearing, the releasing of said clutch and engaging of said brake serving to effect a down gear change, said brake comprising two sets of friction plates and a movable brake carrier (78) carrying one of said sets of friction plates, means to urge said carrier to press one of said sets against the other set in the direction for engaging the brake, said other set being connected with said gearing part (74), means for urging said one set in the opposite direction for disengaging the brake, two sets of torque transmitting cam teeth (83) on said brake carrier (78) and on said fixed part (79) respectively, said sets of cam teeth being permanently meshed with each other and being so shaped as to transmit reaction torque to said fixed part and applying brake engaging pressure to said carrier and said one set of brake friction plates only when the brake carrier is transmitting reaction torque through said cam teeth to the fixed part.

2. A power transmission apparatus as claimed in claim 1 wherein the clutch comprises two sets of friction plates, said rotary input member being in the form of a cylinder, a piston in said cylinder, one of said sets being carried by the piston and the other set being carried by the input member of the planetary gearing, means for applying fluid pressure to the piston in the direction for engaging the two sets of friction plates, means for urging the two sets in the direction for disengaging the friction plates, two sets of torque transmitting cam projections, one set of cam projections being carried by said rotary input member (40) and the other set of cam projections being carried by said piston, said sets of cam projections being permanently meshed with each other and so shaped as to urge the piston in the clutch engaging direction only when the rotary input member (40) is transmitting torque through the clutch to the input gear member (61).

3. A power transmission apparatus as claimed in claim 1 having means for applying fluid pressure to the clutch and to the brake for engaging them, the brake being engaged while the clutch is being released to effect a down gear change.

4. A power transmission apparatus as claimed in claim 1 including a second clutch having input and output clutch members (46, 65), fluid operated means for engaging said clutch members, means for urging said clutch members relatively in the disengaging direction, said planetary gearing including a second gear input member (66) connected with the second clutch output member (65), said second clutch input member being driven by said rotary input member (40) whereby engagement of the first clutch and the brake produces one gear ratio, engagement of the second clutch while the first clutch is disengaged and the brake is engaged produces up change to second gear, engagement of the first clutch while the second clutch remains engaged and the brake is released produces direct drive 3rd gear, and release of the first clutch while the second clutch remains engaged produces down change to second gear while the brake engagement is self timing in relation to the release of the first clutch.

5. A power transmission apparatus comprising a rotary input member in the form of two coaxial cylinders, first and second pistons (49, 46) located in the cylinders first and second clutches each comprising two sets of friction plates one of each sets being engaged by the pistons respectively, means for selectively urging the pistons to engage the clutches, means for urging the pistons in the disengaging direction, first and second rotary gear members (61, 66) carrying the other sets of plates respectively, a sun gear member (61) connected to the first gear member (61) and provided with two sets of sun gear teeth (62, 63), first and second sets of planetary pinions (67, 71) engaging the two sets of sun gear teeth respectively, the first set of pinions having spindles carried by the second gear member (66), a first ring gear (73) engaging the first set of pinions (67), a cage (72), said second set of pinions (71) having spindles carried by said cage, a second ring gear (74) engaging said second set of pinions (71), a brake (76, 77) engageable with said second ring gear (74), said brake comprising sets of friction plates, said brake including an axially movable part which carries one of the sets of brake friction plates the other set of brake friction plates being carried by said second ring gear (74), an output shaft (69), said cage being connected with said output shaft, two sets of torque transmitting cam teeth (55) permanently meshed together and respectively carried by said first piston (49) and rotary input member (48), said sets of cam teeth co-operating with each other to urge the first piston to the engaging direction when the rotary input member is transmitting torque to the first gear member (61), and two sets of reaction torque transmitting cam teeth (83) on an axially movable part of the brake (78) and a fixed part of the apparatus, said sets of cam teeth being permanently meshed with each other and being so shaped as to transmit reaction torque to said fixed part and applying brake engaging pressure to the brake friction plates only in the direction when the brake part is transmitting reaction torque through said cam teeth to the fixed part.

6. A power transmission apparatus as claimed in claim 5 having a second brake engageable with the second rotary gear member (66) for producing reverse drive.

7. Power transmission apparatus comprising a rotary input member, a gearing driven by said input rotary member, a plurality of friction devices acting on said gearing for changing gear ratios, at least one such friction device comprising two sets of friction plates, two co-operating relatively movable members, one of said members carrying one of said sets of plates, a carrier for the other set of plates, said member carrying one set of plates and said carrier both being driven rotatably by the gearing, fluid pressure actuated means for effecting relative movement between said members for engaging the two sets of plates with each other, means for urging said members relatively in the direction to disengage the two sets of plates, and two sets of torque transmitting cam projections mounted on and between said two members, said cam projections being in constant mesh with each other, said cam projections being so shaped as to apply engaging pressure to the friction plates only when torque between said members is in the direction to effect engagement of the plates, the shape of the cam projections being such that no such engaging pressure is applied during disengagement of said plates from each other.

* * * * *